May 10, 1966 J. LISKA ETAL 3,250,923
INSTRUMENT FOR PROVIDING PULSES AT DESIRED INTERVALS
Filed June 22, 1964 4 Sheets-Sheet 1

INVENTORS
JOHN LISKA
CHARLES A. KING
BY
ATTORNEY

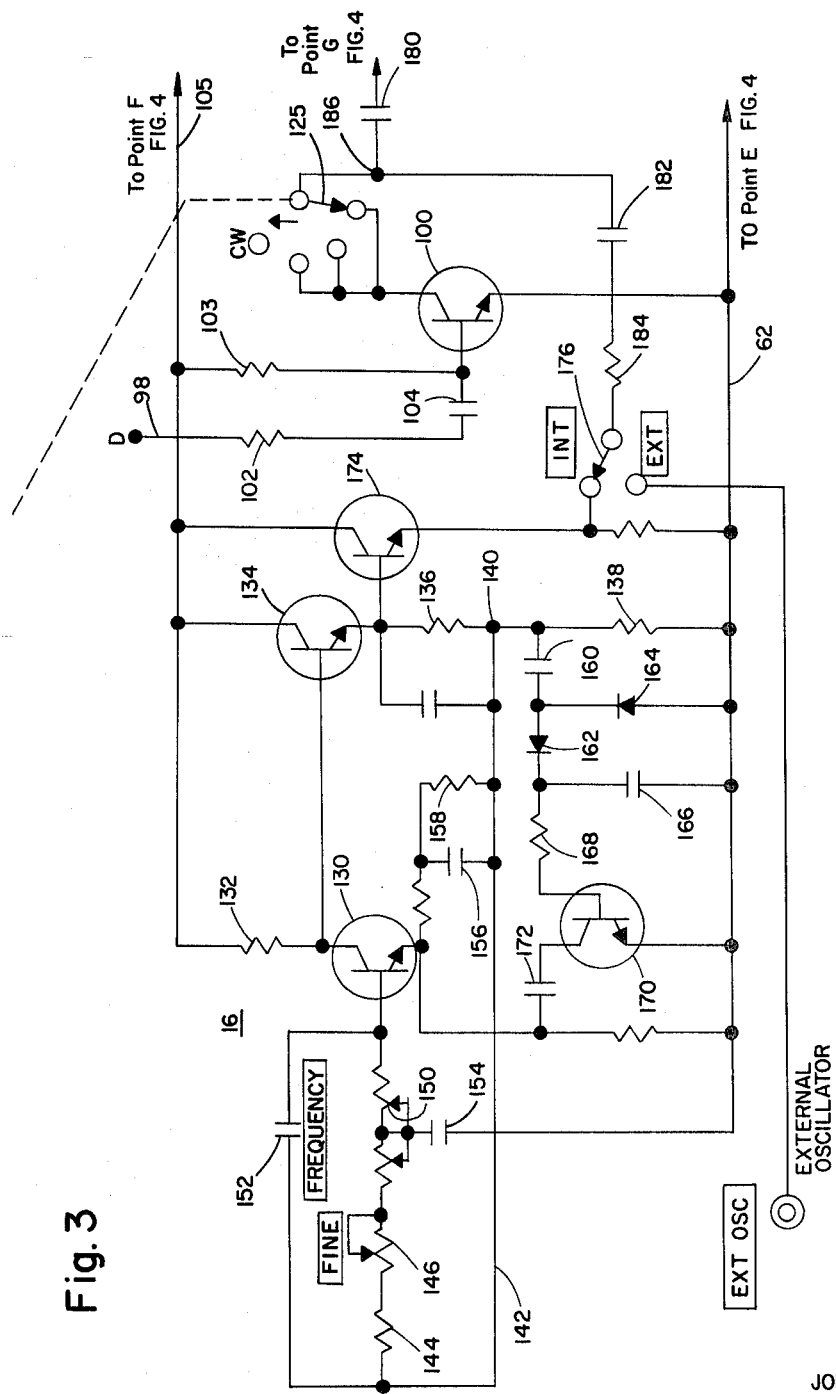

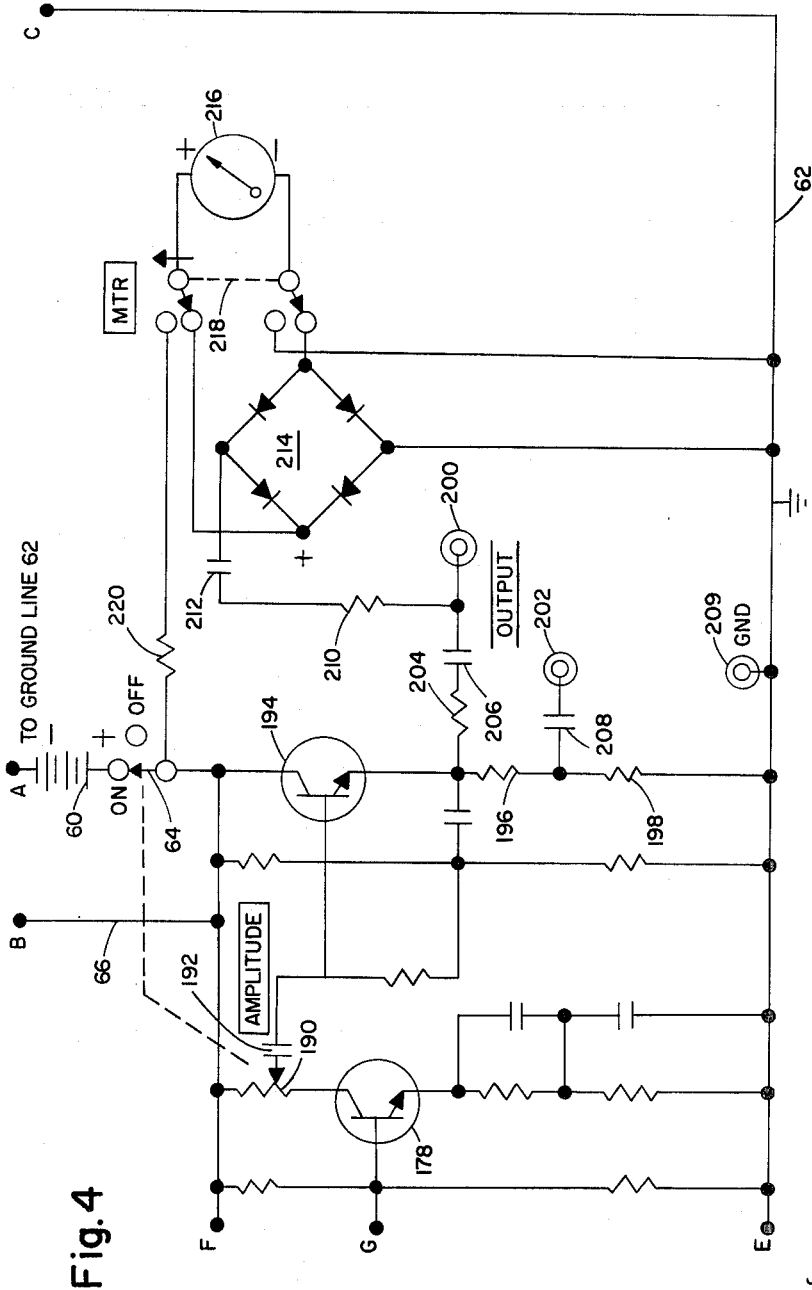

United States Patent Office 3,250,923
Patented May 10, 1966

3,250,923
INSTRUMENT FOR PROVIDING PULSES AT DESIRED INTERVALS
John Liska, Panorama City, Calif., and Charles A. King, Norfolk, Va., assignors to The Bendix Corporation, North Hollywood, Calif., a corporation of Delaware
Filed June 22, 1964, Ser. No. 376,731
10 Claims. (Cl. 307—88.5)

This invention relates to electrical instrumentation and testing devices and more particularly to an instrument for making precise measurements of intervals between electrical events.

In sonar equipment an electrical keying pulse is supplied to a transducer which converts the pulse to acoustic energy in the form of a compression wave in the water. This wave travels through the water, strikes an object and is reflected back at a known rate. By knowing the elapsed time between sending of the pulse and receiving the reflected pulse, the distance to the object may be determined. No really satisfactory method of checking the calibration of sonar equipment in its operating environment has been available. Navy sonarmen have, in the past, attempted to use a stopwatch for timing and adjusting of the range presentations on their equipment. This allows for a substantial amount of human error which could result in calibration errors of up to a few hundred yards in linear measurement. To insure reasonable accuracy, it should be possible to calibrate sonar equipment at least within a few milliseconds. Such calibrating equipment must provide measured time intervals within the stated accuracy, must be convenient and efficient in operation, and should be comparatively inexpensive to produce and sell. It is therefore an object of the present invention to provide a simple electrical instrument capable of generating time marker signals having accuracies to within a fraction of a millisecond.

It is another object of the present invention to provide an instrument meeting the above objective in which said signals are variable in range, frequency, pulse width, and relative target size (signal amplitude).

It is another object of the present invention to provide an electrical instrument meeting the above objectives which is highly portable, rugged, and convenient to use.

It is a further object of the present invention to provide an electrical instrument meeting the above objectives which is comparatively simple in structure and fabrication, thereby making it inexpensive to produce.

Other objects and advantages will become apparent from the following specification and the accompanying drawings in which:

FIGURE 3 is a schematic diagram of the oscillator and gate circuits of FIGURE 1; and FIGURE 4 is a schematic diagram of the amplifier and output circuits of FIGURE 1.

Figure 1:
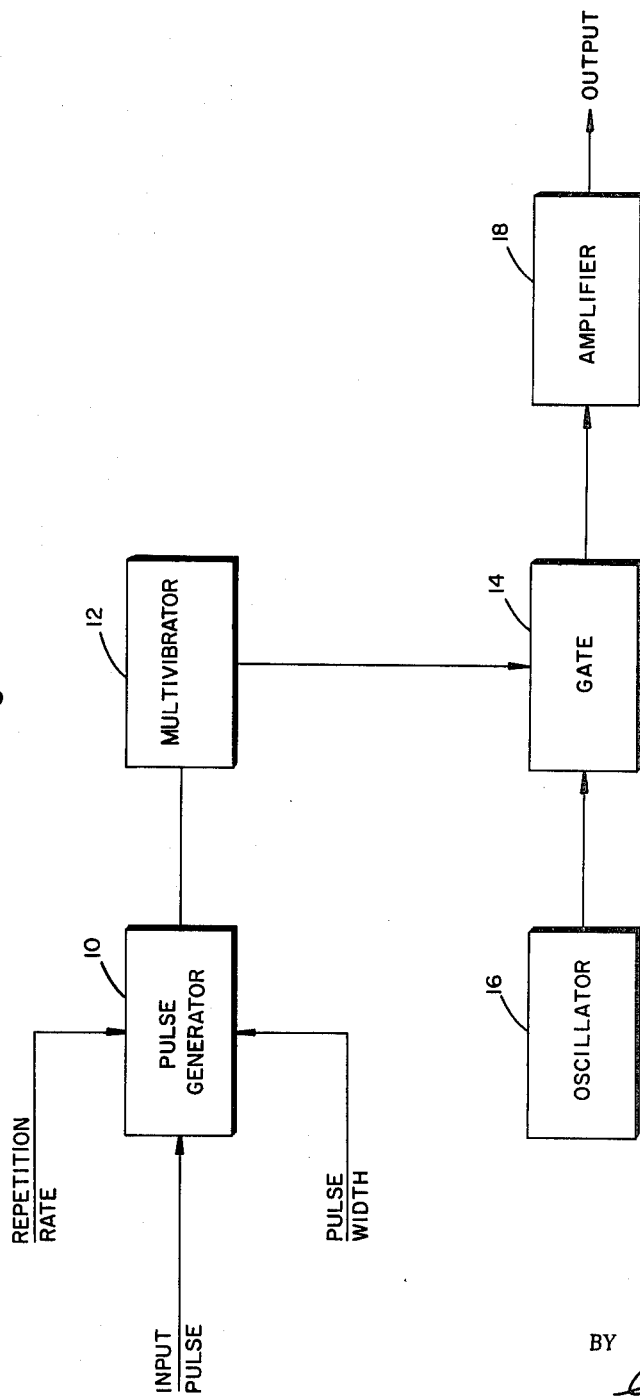
FIGURE 1 is a block diagram of a range-calibrating circuit incorporating our invention.

Referring now to FIGURE 1, a pulse generator 10 receives a keying pulse from the sonar set which sets an initial time marker. Generator 10 is adjusted to vary the repetition rate and pulse intervals of its output. The output pulses from generator 10 serve to trigger the multivibrator 12 which provides a series of negative gating pulses of the desired repetition rate and width (time duration) to the gate 14. An oscillator 16 generates an alternating current signal of the selected frequency which is supplied to gate 14, where it is either blocked or passed, depending upon whether a negative gating pulse is being received from the multivibrator 12. The signal which appears at the output of gate 14 constitutes a pulsed C.W. (continuous wave), with the pulses varying in width and frequency as established by the pulse width and frequency of the negative gate signal. These pulsed C.W. signals are amplified in an amplifier 18 and are then fed to the sonar receiving and display circuits. If the sonar is properly adjusted, it should then provide a reading which corresponds to the interval selected on the range calibrator.

Figure 2:
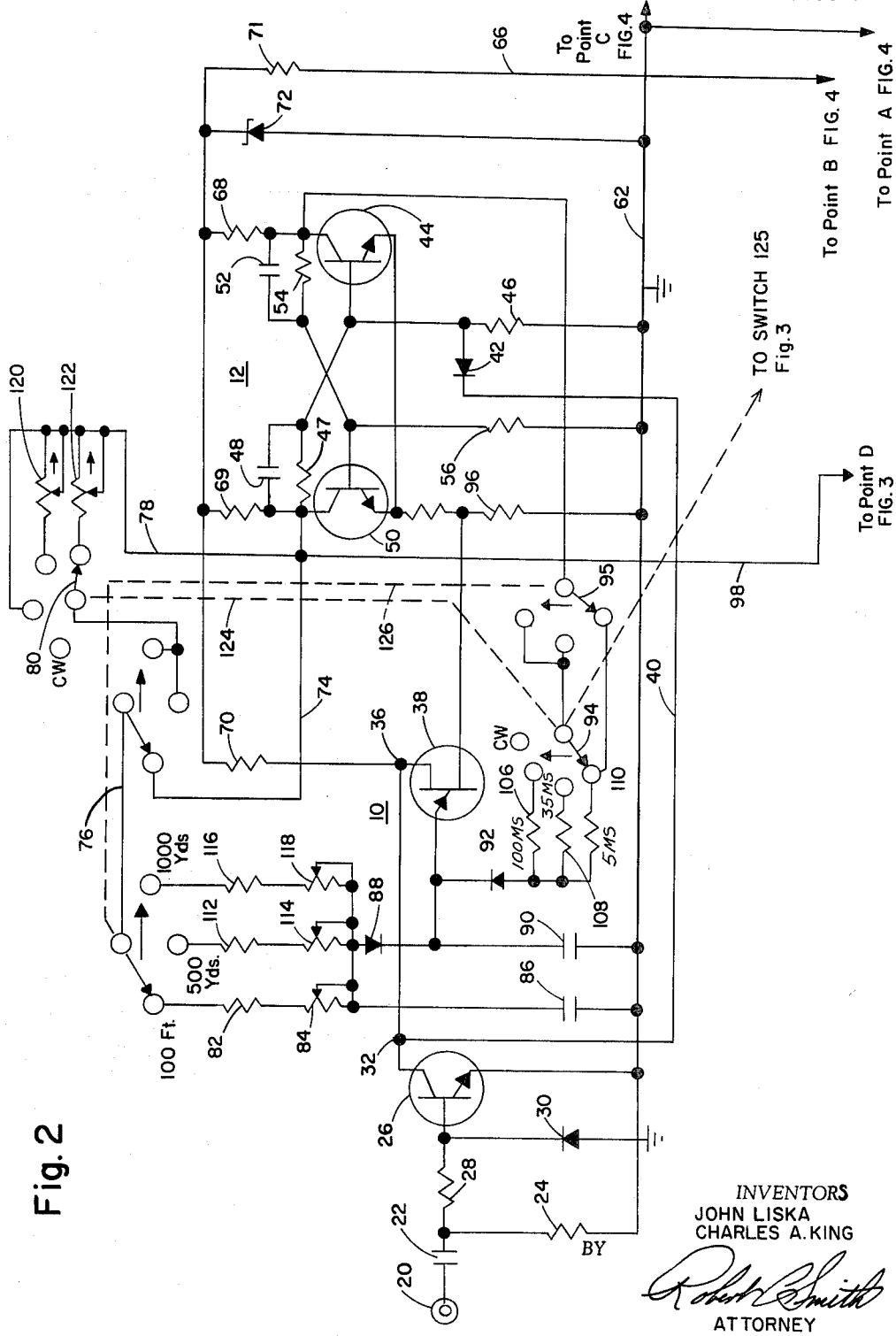
FIGURE 2 is a detailed schematic diagram of the timing circuit and multivibrator of FIGURE 1.

FIGURE 2 is a detailed schematic of the timing circuit and multivibrator of FIGURE 1. The synchronizing pulse from the sonar is received at a terminal 20. This pulse is differentiated in a differentiating circuit consisting of a capacitor 22 and a resistor 24 to produce a positive spike to the base of a transistor 26. A current-limiting resistor 28 protects the transistor 26 from excessive current flow, and a clamping diode 30 provides protection from any negative excursion which might otherwise appear across the base-emitter circuit of transistor 26. The output of transistor 26 appears at a point 32 in the collector circuit and is connected to a terminal 36 at the base-two terminal of a unijunction transistor 38. Also connected to point 32 through a conductor 40 is a diode 42, connected in the base circuit of a transistor 44, said transistor forming one of the active elements of the multivibrator 12. Diode 42 is normally back-biased, and the base of transistor 44 is biased through a biasing resistor 46. Also connected to the base circuit of transistor 44 are a resistor 47 and a capacitor 48 located in the collector circuit of a transistor 50 which is the other active element of the multivibrator. Similarly, capacitor 52 and resistor 54 are connected in the collector circuit of transistor 44 and to the base of transistor 50. A biasing resistor 56 is connected between the base of transistor 50 and ground.

Power is supplied to the system by means of a battery 60 (see FIG. 4) which has its negative side connected to a ground line 62 and its positive terminal connected to an on-off switch 64. The "on" terminal is connected to a conductor 66 which supplies power to the collector circuits of transistors 44 and 50 through resistors 68 and 69, respectively, and to base two of the unijunction transistor through a resistor 70 connected to point 36. A voltage-regulating circuit consisting of a series resistor 71 and a Zener diode 72 is included to control the voltage applied to the timing circuits whose time constants would tend to vary with a varying power supply voltage. Power from the battery source is also supplied from the collector circuit of transistor 50 through a conductor 74 to a switch 76 and through a conductor 78 to a switch 80. When switch 76 is in the position shown, it connects the battery voltage to a timing circuit consisting of a pair of series-connected resistors 82 and 84 which are connected to the ground line 62 through a capacitor 86 and also through a diode 88 and a capactior 90 connected in parallel with capacitor 86. The emitter of unijunction transistor 38 is connected to the junction between diode 88 and capacitor 90. A diode 92 and switches 94 and 95 are connected between the emitter of unijunction transistor 38 and the collector of transistor 44.

In the absence of an input synchronizing pulse to terminal 20, essentially the battery voltage will appear at point 36 which is the base-two terminal of the unijunction transistor 38 and at the same time will flow across resistor 69, through wire 74, and switch 76 to the R-C timing circuit consisting of resistors 82 and 84, capacitors 86 and 90, and diode 88, causing the voltage to build up at a rate established by the values of the said resistors and capacitors. As the voltage increases, it will reach a value where the voltage at the emitter of the unijunction transistor 38 reaches a critical proportion of the value of the voltage at point 36, causing unijunction transistor 38 to conduct. Current then flows quickly through transistor 38 and through a resistor 96 to ground, causing a positive triggering voltage pulse to appear in the emitter circuit of transistors 50 and 44. This causes the multivibrator 12 to change its state, and transistor 50 to begin conducting and transistor 44 to be shut off. When transistor 50 conducts, the voltage level at its collector drops suddenly, and this reduced voltage is conducted through wire 98 to the base of gate transistor 100 (see FIG. 3). A current-limiting resistor 102 and a coupling capacitor 104 are provided in the base circuit of transistor 100. A resistor 103 is connected between the power line 105 and the base of transistor 100 to provide forward bias for the gate.

When an input pulse appears at terminal 20, it is differentiated to produce a positive spike at the base of transistor 26. This causes transistor 26 to begin to conduct, resulting in a substantial voltage drop at points 32 and 36. Through conductor 40 this lowered voltage also appears at the base of transistor 44, causing it to be shut off, thereby causing an increased voltage to appear at its collector and, hence, at the base of transistor 50. This biases the transistor 50 in the forward direction, which causes it to begin conducting, thereby providing a negative pulse to the base of the gate transistor 100. Thus, the synchronizing pulses from the sonar act to initiate the timing of the gating pulses, and keep the range-calibrating system synchronized with the output pulses of the sonar system. The reduced voltage level appearing at point 36 also causes unijunction transistor 38 to conduct, quickly discharging either capacitor 90 or capacitor 90 and capacitor 86 through resistor 96 to ground, depending upon which of transistors 44 or 50 is cut off, after which the voltage appearing at the emitter of unijunction transistor 38 drops to a low value. Unijunction transistor 38 then stops conducting, and the potential at point 36 again rises to near the battery voltage.

Once transistor 50 begins supplying a negative pulse to the gating transistor 100, the duration or "width" of this pulse is controlled by the timing circuit consisting of capacitor 90, diode 92, and the resistance value selected by switch 94 from among resistors 106, 108 and 110. The negative pulse continues until sufficient charge has again built up on capacitor 90 to cause conduction of unijunction transistor 38, which again causes a triggering pulse to appear at the emitter of transistors 50 and 44 which reverses the state of the multivibrator, shutting of the negative pulse to gating transistor 100.

When the range switch 76 is moved to the 500-yard position or the 1000-yard position, either resistors 112 and 114 or resistors 116 and 118, respectively, are connected into the timing circuit with capacitors 86 and 90. This, of course, changes the time constant of the timing circuit in proportion to the time required for a pulse from the sonar to travel through the water and return to the sonar from the selected distance. It will be observed that when switch 76 is in one of these positions, it connects the switch 80 in series, thereby adding, in series, either of the variable resistors 120 or 122. Switch 80 is ganged, through a mechanical connection 124, with switch 94 and also with a switch 125 in the gate circuit (see FIG. 3). Switch 76 is ganged, through a mechanical connection 126 to switch 95, in the pulse width circuit. The foregoing structure produces the following switching arrangement. When switch 76 is in the position shown, a 100-foot range is selected, which selects a very short time interval from the timing circuits. This interval is so short that only the 5-millisecond pulse width resulting when switch 94 places resistor 110 in the pulse width circuit is compatible with the interval. Thus switch 76 is ganged with switch 95 to always provide the 5-millisecond pulse width with the 100-foot range. Movement of switch 94 to other positions produces no effect since resistors 108, 106, 120 and 122 are kept out of the circuit. When switch 76 is moved to select the 500-yard range (resistors 112 and 114), either the 35- or the 100-millisecond pulse width may be selected on switch 94. The same is true of moving switch 76 to the 1000-yard range (resistors 116 and 118). In each of the latter cases, however, movement of switch 94 to select the desired pulse width also moves switch 80 to provide the desired correction in the range for the pulse width. It is necessary that when the switch 76 selects the 500-yard range, for example, this range remains the same irrespective of the pulse width selected.

Oscillator 16 is a free-running sine wave oscillator of the "bridge-T" type. The principal amplifying element is a transistor 130 which has its collector voltage supplied from battery 60 through a wire 105 and a collector resistor 132. The output of the transistor 130 appears at its collector where it is directly coupled to the base of a transistor 134 which is connected in the circuit in an emitter-follower configuration such that the oscillator output appears across a pair of resistors 136 and 138 connected between its emitter and the ground line 62. The junction between these resistors will be designated as point 140. The voltage appearing between point 140 and ground is the feedback voltage, and this voltage is supplied to both a negative and a positive feedback loop in addition to an automatic gain control loop connected to control the positive feedback. The negative feedback signal is connected through a conductor 142 to one end of a resistance network including resistor 144, rheostat 146, ganged potentiometer 150, and to a capacitor 152 connected in parallel with said network, and from thence to the base of transistor 130. A capacitor 154, which forms part of the frequency-determining network, is connected between the sliders of ganged potentiometer 150 and ground. Coarse adjustments on frequency are provided by ganged potentiometer 150, and a further, fine, adjustment is provided by rheostat 146.

The voltage at point 140 is also connected, through a capacitor 156 and a resistor 158, to the emitter of transistor 130. So connected, this feedback voltage provides positive feedback which, of course, is required to provide oscillation. The magnitude of the oscillator swings, or voltage excursions, is controlled by an automatic gain control circuit which varies the effective magnitude of this positive feedback signal. The feedback voltage across resistor 138 is supplied through a coupling capacitor 160 to a diode half-wave voltage doubler circuit consisting of two diodes 162 and 164. This feedback voltage, thus changed to a pulsating D.C., is filtered by means of a capacitor 166 and is connected through a resistor 168 to the base of a transistor 170. The emitter of transistor 170 is grounded, and its collector is connected through a capacitor 172 to the emitter of transistor 130. The positive feedback signal appearing at the collector of transistor 170 appears as a D.C. voltage at the emitter of transistor 130 in such phase as to oppose the positive feedback signal. If the oscillations become too large, this D.C. automatic gain control signal will increase and thereby reduce the effective positive feedback signal, thus reducing the magnitude of the oscillations. If they become smaller than desired, the D.C. automatic gain control signal will be reduced, thus permitting a larger proportion of the positive feedback signal to drive the transistor 130 and thereby causing an increase in the oscillations.

To provide a desired isolation between the oscillator 16 and subsequent stages, the oscillator output is connected to gate 14 through a separate emitter-follower amplification stage including a transistor 174. The emitter of transistor 174 is connected through a switch 176 to the base circuit of a transistor 178 (see FIG. 4) by way of coupling capacitors 180 and 182 and a resistor 184. Switch 176 provides a means for connecting an external oscillator into the system, if desired. Switch section 125 (which is ganged to switch 94) is connected to a junction 186 between capacitors 180 and 182 and also in the collector circuit of the gate transistor 100. The oscillator signal appearing at the base of transistor 178 is amplified therein, appearing in the collector circuit from whence it is supplied to a potentiometer 190 (mechanically connected with the off-on switch 64) which operates as a gain control for the system. The voltage selected on the slider of potentiometer 190 is coupled through a capacitor 192 to the base of an emitter-follower amplifier stage including a transistor 194. The output of the system appears between the emitter of transistor 194 and ground where it is divided by means of a pair of resistors 196 and 198 to provide outputs at different desired voltage levels. A pair of output terminals 200 and 202 are connected to provide these different output levels. Terminal 200 is connected to the emitter of transistor 194 through a coupling circuit consisting of a resistor 204 and a capacitor 206, and terminal 202 is coupled to the junction between resistors 196 and 198 by means of a capacitor 208. A ground terminal 209 is also provided.

Connected across the output of the system are a resistor 210, a coupling capacitor 212 and a full wave diode rectifying bridge 214. This structure samples the output, rectifies it, and impresses the rectified signal across a D.C. meter 216, thereby providing a meter indication of the output voltage. A switch 218 connects meter 216 either to the output of bridge 214 or across the battery through resistor 220 and switch 64, thereby providing means for reading either the output voltage or the battery voltage.

The described system, in addition to providing pulsed C.W. signals of desired width and interval, also includes means for delivering a continuous wave (C.W.) oscillator signal to the output. When C.W. operation is desired, switches 94, 80 and 125 are moved to the C.W. position. These switches effectively block the switching of the multivibrator 12 and remove the gate transistor 100 from the circuit, allowing the oscillator output to be supplied without interruption to amplifier 18.

In operation, it will be assumed that the range-calibrating device is connected to receive a synchronizing pulse from a sonar device which emits a pulse into the water and that the sonar receives a reflected pulse which appears on its screen in a form representative of a specific distance of the target, based on the time required for the pulse to reappear at the transducer. The time required for the pulse to travel through the water is a known quantity. What may not be known is the error or time lag introduced by some malfunction within the sonar. By connecting the sonar synchronizing pulse to the input 20 and selecting the desired range and pulse width, the appropriate interval is imposed between the input and output pulses to correspond to the selected range. The output signal is then fed into the sonar at the point where it receives the reflected signals, and the resulting sonar display should agree with the range selected on the range calibrator. If it does not agree, some maladjustment or malfunction of the sonar equipment is indicated.

Within the calibrating device itself, the arrival of a synchronizing pulse causes transistor 26 to conduct, which instantly reduces the voltage at points 32 and 36 nearly to ground, whereupon the charge built up on the capacitors 86 and 90 or capacitor 90, depending upon which timing circuit is being charged, discharges rapidly through unijunction transistor 36 and resistor 96 to ground. At the same time the reduction in voltage at the base of transistor 44 cuts it off and causes transistor 50 to be on, which trips the multivibrator causing a substantial drop in the voltage appearing at the base of gate transistor 100, which causes transistor 100 to be cut off. The oscillator signal appearing at junction 186 which was previously conducted to ground through transistor 100 now appears at the input to amplifier 18.

Gate transistor 100 remains cut off until the voltage across capacitor 90 again reaches the critical voltage, causing unijunction transistor 38 to fire, which again causes the multivibrator to change state and transistor 100 to begin conducting, thereby interrupting the oscillator output. At this time the "range" timing circuit including capacitors 86 and 90 begins charging, during which period gate transistor 100 continues to conduct. When the voltage across capacitors 86 and 90 reaches the critical value, the unijunction transistor 38 again conducts, the multivibrator again changes state and the gate is again opened, whereupon another pulse of oscillator C.W. signal begins flowing to the amplifier.

From the foregoing, it will be understood that the range calibrator includes an oscillator which is adjustable to provide an output over a range of desired frequencies, and that this output may be interrupted to provide pulsed C.W. signals at the desired interval, the width of the pulses being variable independently of the interval.

It will be recognized by those skilled in the art that the system described herein has a number of possible applications other than as a generator of test signals for calibrating sonar systems. Obviously the device functions as a signal generator with C.W. or pulsed output over the range of the oscillator. It also may serve as an accurate time marker generator for oscilloscope or other cathode ray tube equipment for the specific intervals employed, and the number and magnitude of the intervals may be varied to suit requirements. It may also serve as a signal injector for plotting frequency response curves for many types of equipment.

While only a single embodiment has been shown and described herein, modifications may be made to suit specific requirements.

We claim:

1. A testing device for producing a series of pulses of a desired frequency and duration at desired intervals and supplying said pulses to an external utilization circuit including a power source, means receiving a synchronizing pulse from an external source, an oscillator having an output comprising an alternating current signal and including means for varying the frequency of said signal, an amplifier for amplifying said oscillator signal and supplying it to said external utilization circuit, a gate interposed between said oscillator and said amplifier for controlling the transmission of the oscillator signal to said amplifier, and pulse-generating means for supplying blanking pulses to said gate:

said pulse-generating means including a bistable multivibrator connected to said power source and to said gate having a first active element which conducts current during one of its stable states and a second active element which conducts current during the other of its stable states, a unijunction transistor connected to said power source and to said multivibrator to supply triggering pulses thereto, a first timing circuit including capacitance means and a unidirectional conducting device connected between said unijunction transistor and one of said multivibrator active elements, differentiating and amplifying means for converting said synchronizing pulse into a triggering pulse for causing firing of said unijunction transistor and cutting off one of said multivibrator active elements, a second timing circuit including a capacitor and a unidirectional conducting device connected between said unijunction transistor and one of said multivibrator active elements, a plurality of resistance paths in said first timing circuit and switching means for selecting one of said paths for controlling the time required for the voltage across said capacitance means to build up to a value sufficient to cause firing of said unijunction transistor, thereby causing said multivibrator to change state and determining the interval between pulses supplied to said gate, and a plurality of resistance paths in said second timing circuit and switching means for selecting one of said paths for controlling the time required for the voltage across said capacitor to build up to a value sufficient to cause firing of said unijunction transistor, causing said multivibrator to change state, thereby determining the duration of the pulses supplied to said gate.

2. A testing device as set forth in claim 1 wherein said first timing circuit includes a second group of resistance paths connectible in series with said selected path, and switching means are provided for selecting one of said second group of resistance paths simultaneously with the selection of at least some of the possible pulse durations, thereby providing a means of modifying the pulse interval in accordance with changes in the selected pulse duration.

3. A testing device as set forth in claim 1 wherein said oscillator includes a first transistor having base, emitter and collector electrodes, a negative feedback loop comprising a resistance-capacitance network of a bridge-T configuration connected between the output of said oscillator and said base electrode, a voltage source is connected to said collector electrode, a positive feedback loop is connected between the output of said oscillator and said emitter electrode to support oscillations, and an automatic gain control circuit is connected between said oscillator output and said emitter electrode to control the magnitude of the oscillations, said gain control circuit including a second transistor having an input electrode and an output, a coupling capacitor, a diode voltage doubler and filtering means connected between the output of said oscillator and the input electrode of said second transistor, and the output of said second transistor being connected to said emitter electrode.

4. A testing device for producing a series of pulses of a desired frequency and duration at desired intervals and supplying said pulses to an external utilization circuit including a power source, means receiving a synchronizing pulse from an external source, an oscillator having an output comprising an alternating current signal, an amplifier for amplifying said oscillator signal and supplying it to said external utilization circuit, a gate interposed between said oscillator and said amplifier for controlling the transmission of the oscillator signal to said amplifier, and pulse-generating means for supplying gating pulses to said gate:

said pulse-generating means including a bistable multivibrator connected to said power source and to said gate, a unijunction transistor connected to said multivibrator for supplying triggering pulses thereto, a first timing circuit connected to control the firing of said unijunction transistor including means for varying the time constant thereof for controlling the interval between pulses supplied to said gate, a second timing circuit connected to control the firing of said unijunction transistor interposed between said unijunction transistor and said multivibrator including means for varying the time constant thereof for providing a number of possible durations for the pulses supplied to said gate, and differentiating means for receiving said synchronizing pulse and converting said synchronizing pulse into a triggering pulse for firing said unijunction transistor to thereby synchronize said device with said external source.

5. A testing device as set forth in claim 4 wherein said oscillator includes a transistor having base, emitter, and collector electrodes, a negative feedback loop comprising a resistance-capacitance network of bridge-T configuration is connected between the oscillator output and said base electrode, a voltage source is connected to said collector electrode, a positive feedback loop is connected between the output of said oscillator and said emitter electrode to support oscillations, and an automatic gain control circuit including amplification means is connected between the output of said oscillator and said emitter electrode.

6. A testing device as set forth in claim 5 wherein said resistance-capacitance network includes variable resistance means connected in each of two branches of said bridge-T configuration to permit varying the frequency of the oscillator signal.

7. A testing device for producing a series of pulses of a desired frequency and duration at desired intervals and supplying said pulses to an external utilization circuit including a power source, an oscillator having an output comprising an alternating current signal, an amplifier for amplifying said oscillator signal and supplying it to said external utilization circuit, a gate interposed between said oscillator and said amplifier for controlling the transmission of said oscillator signal to said amplifier, and pulse-generating means for supplying gating pulses to said gate:

said pulse-generating means including a bistable multivibrator connected to said power source and to said gate, a unijunction transistor connected to said multivibrator for supplying triggering pulses thereto, a first timing circuit connected to control the firing of said unijunction transistor including means for varying the time constant thereof for controlling the interval between pulses supplied to said gate, and a second timing circuit connected to control the firing of said unijunction transistor interposed between said unijunction transistor and said multivibrator including means for varying the time constant thereof for providing a number of possible durations for the pulses supplied to said gate.

8. A testing device as set forth in claim 7 wherein said oscillator includes a transistor having at least base and emitter electrodes, a negative feedback loop comprising a resistance-capacitance network of bridge-T configuration is connected between the oscillator output and said base electrode, a positive feedback loop is connected between the output of said oscillator and said emitter electrode to support oscillations, and an automatic gain control circuit including amplification means is connected between the output of said oscillator and said emitter electrode.

9. A testing device as set forth in claim 8 wherein said resistance-capacitance network includes variable resistance means connected in each of two branches of said bridge-T configuration to permit varying the frequency of the oscillator signal.

10. A testing device as set forth in claim 7 wherein said first timing circuit includes a first group of resistance paths and switching means for selecting a desired path from among said group and a second group of resistance paths connectible in series with the selected path of said first group, and switching means for selecting one of said second group of resistance paths simultaneously with the selection of at least some of said possible pulse durations.

No references cited.

ARTHUR GAUSS, *Primary Examiner.*

J. ZAZWORSKY, *Assistant Examiner.*